U S008851810B2

(12) United States Patent
Ishi (10) Patent No.: US 8,851,810 B2
(45) Date of Patent: Oct. 7, 2014

(54) CUTTING TOOL AND METHOD OF MANUFACTURING MACHINED PRODUCT USING THE SAME (75) Inventor: Hirohisa Ishi, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 95 days.

(21) Appl. No.: 13/388,100

(22) PCT Filed: Jul. 29, 2010

(86) PCT No.: PCT/JP2010/062777
§ 371 (c)(1),
(2), (4) Date: Jan. 31, 2012

(87) PCT Pub. No.: WO2011/024595
PCT Pub. Date: Mar. 3, 2011

(65) Prior Publication Data
US 2012/0128440 A1 May 24, 2012

(30) Foreign Application Priority Data

Aug. 31, 2009 (JP) ................. 2009-200059

(51) Int. Cl.
*B23C 5/20* (2006.01)
*B23C 5/22* (2006.01)
*B23C 5/00* (2006.01)
*B23C 5/06* (2006.01)

(52) U.S. Cl.
CPC ............. *B23C 5/006* (2013.01); *B23C 5/202* (2013.01); *B23C 2200/0444* (2013.01); *B23C 5/2213* (2013.01); *B23C 2200/323* (2013.01); *B23C 2210/168* (2013.01); *B23C 5/06* (2013.01); *B23C 2200/205* (2013.01)
USPC .............. 409/132; 407/34; 407/42

(58) Field of Classification Search
CPC ........ B23C 5/00; B23C 5/26; B23C 2210/02; B23C 2210/16; B23C 2210/168
USPC .............. 407/34, 42, 48, 53, 56, 61, 113; 409/132, 131
See application file for complete search history.

(56) References Cited

U.S. PATENT DOCUMENTS 3,934,319 A * 1/1976 Schuler ..................... 407/113
4,645,384 A * 2/1987 Shimomura et al. ........... 407/42
(Continued)

FOREIGN PATENT DOCUMENTS

CN 101460276 A 6/2009
DE 10308037 A1 * 9/2004
(Continued)

OTHER PUBLICATIONS

Japanese Office Action, Japanese Patent Application No. 2011-528716, and Statement of Relevance of Non-English References, Jun. 4, 2013, 3 pp.

(Continued)

Primary Examiner — Andrea Wellington
Assistant Examiner — Nicole N Ramos
(74) Attorney, Agent, or Firm — Volpe and Koenig, P.C.

(57) ABSTRACT

A cutting tool of the present invention includes a cutting insert and a holder having at a front end part thereof an insert pocket for attaching the cutting insert. The insert pocket includes a seating part including a seating face which is brought into contact with the lower surface of the cutting insert, and is inclined forward in a rotation direction of the holder as the seating face separates from the front end part of the holder; and a constraining part brought into contact with first and second side surfaces adjacent to each other among the side surface of the cutting insert. The constraining part includes a curved portion; a first constraining face which is connected to one end of the curved portion and extends perpendicularly with respect to the rotation axis of the holder as the first constraining face separates from the curved portion, or extends away from the front end part of the holder; and a second constraining face which is connected to the other end of the curved portion and extends toward the front end part of the holder in the direction away from the curved portion. A method of manufacturing a machined product using the cutting tool is provided.

14 Claims, 5 Drawing Sheets

(56) References Cited

U.S. PATENT DOCUMENTS

| | | | |
|---|---|---|---|
| 5,904,450 A * | 5/1999 | Satran et al. | 407/113 |
| 6,079,912 A | 6/2000 | Rothballer | |
| 6,196,771 B1 | 3/2001 | Andersson | |
| 7,232,279 B2 | 6/2007 | Smilovici et al. | |
| 7,252,461 B2 * | 8/2007 | Karonen | 407/113 |
| 7,419,338 B2 | 9/2008 | Smilovici et al. | |
| 7,431,540 B2 * | 10/2008 | Lof et al. | 407/113 |
| 7,547,164 B2 * | 6/2009 | Hessman | 407/113 |
| 7,604,441 B2 * | 10/2009 | Bhagath | 407/113 |
| 8,096,735 B2 * | 1/2012 | Sladek et al. | 407/114 |
| 2004/0146365 A1 * | 7/2004 | Usui et al. | 407/113 |
| 2006/0210364 A1 * | 9/2006 | Bellmann et al. | 407/40 |
| 2007/0003384 A1 | 1/2007 | Smilovici et al. | |
| 2007/0224006 A1 | 9/2007 | Smilovici et al. | |
| 2010/0111619 A1 | 5/2010 | Ballas et al. | |
| 2010/0221076 A1 | 9/2010 | Takahashi et al. | |

FOREIGN PATENT DOCUMENTS

| | | | |
|---|---|---|---|
| JP | 58-196018 | | 12/1983 |
| JP | 07251302 A | * | 10/1995 |
| JP | 08323510 A | * | 12/1996 |
| JP | 2000-503912 A | | 4/2000 |
| JP | 2001-502250 | | 2/2001 |
| JP | 2001087928 A | * | 4/2001 |
| JP | 2001096406 A | * | 4/2001 |
| JP | 2003-275920 A | | 9/2003 |
| JP | 2005028502 A | * | 2/2005 |
| JP | 2007-237356 | | 9/2007 |
| JP | 2008-544872 | | 12/2008 |
| WO | WO 2007/004206 | | 1/2007 |
| WO | WO 2008/120188 | | 9/2008 |

OTHER PUBLICATIONS

First Office Action dated Apr. 22, 2013 issued by Chinese Patent Office for Chinese patent application No. 201080031714.9.

* cited by examiner

CUTTING TOOL AND METHOD OF MANUFACTURING MACHINED PRODUCT USING THE SAME

TECHNICAL FIELD

The present invention relates to a cutting tool and a method of manufacturing a machined product using the same.

BACKGROUND ART

Conventionally, various considerations have been made to decrease cutting resistance in a cutting tool that uses cutting inserts by attaching them to insert pockets of a holder. For example, as in the case of Japanese Unexamined Patent Publication No. 2008-544872, the cutting resistance is decreased by inclining a ridge line of a major cutting edge of the cutting insert to make adjustments so that an axial rake angle of a major cutting edge has a positive angle, or by increasing a peripheral cutting edge angle of the major cutting edge.

However, for example, when the peripheral cutting edge of the major cutting edge is increased, the cutting resistance is decreased because chip thickness is decreased, whereas a component force (thrust force) of a cutting force oriented rearward of a rotation axis is increased. Additionally, in this case, when two constraining faces that constrain the cutting insert are formed substantially line-symmetrically at a predetermined angle with reference to the rotation axis direction in the insert pocket, as disclosed in Japanese Unexamined Patent Publication No. 2008-544872, the following problem might occur.

That is, the cutting tool receives such action that a gap between the two constraining faces of the insert pocket is expanded by the thrust force described above. Therefore, by repetitive cutting using this cutting tool, the constraining faces of the insert pocket of the holder are subjected to plastic deformation, so that the fixation of the cutting insert may become unstable.

SUMMARY OF THE INVENTION

An object of the present invention is to provide a cutting tool having excellent durability, and a method of manufacturing a machined product using the cutting tool.

A cutting tool according to an embodiment of the present invention includes a cutting insert, which includes a cutting edge located along an intersection of an upper surface and a side surface, and a holder having at a front end part thereof an insert pocket for attaching the cutting insert. The insert pocket includes a seating part including a seating face which is brought into contact with the lower surface of the cutting insert, and is inclined forward in a rotation direction of the holder as the seating face separates from the front end part of the holder; and a constraining part configured to be brought into contact with a first side surface and a second side surface adjacent to each other among the side surface of the cutting insert. The constraining part includes a curved portion; a first constraining face which is connected to one end of the curved portion and extends perpendicularly with respect to the rotation axis of the holder as the first constraining face separates from the curved portion, or extends away from the front end part of the holder; and a second constraining face which is connected to the other end of the curved portion and extends toward the front end part of the holder in the direction away from the curved portion.

A method of manufacturing a machined product according to an embodiment of the present invention includes rotating the cutting tool; bringing the cutting edge of the rotating cutting tool into contact with a workpiece; and separating the cutting tool from the workpiece.

In the cutting tool according to the embodiment of the present invention, one of the two constraining faces constraining the cutting insert is formed substantially perpendicularly to the rotation axis of the holder. Therefore, compared to the conventional cutting tool in which the two constraining faces constraining the cutting insert are formed substantially line-symmetrically at the predetermined angle with reference to the rotation axis direction, the cutting tool of the present embodiment makes it difficult for the thrust force of cutting force to so act that the two constraining faces are expanded. This reduces plastic deformation of the constraining faces, thus having excellent durability.

BRIEF DESCRIPTION OF THE DRAWINGS

FIG. 1(*a*) is a side view showing a cutting tool according to an embodiment of the present invention; FIG. 1(*b*) is a partially enlarged view thereof;

FIG. 3(*a*) is a top view of the cutting insert shown in FIG. 2; FIG. 3(*b*) is a side view thereof;

FIGS. 6(*a*) to 6(*c*) are process drawings showing a method of manufacturing a machined product according to an embodiment of the present invention.

PREFERRED EMBODIMENTS FOR CARRYING OUT THE INVENTION

<Cutting Tool>

Figure 1:
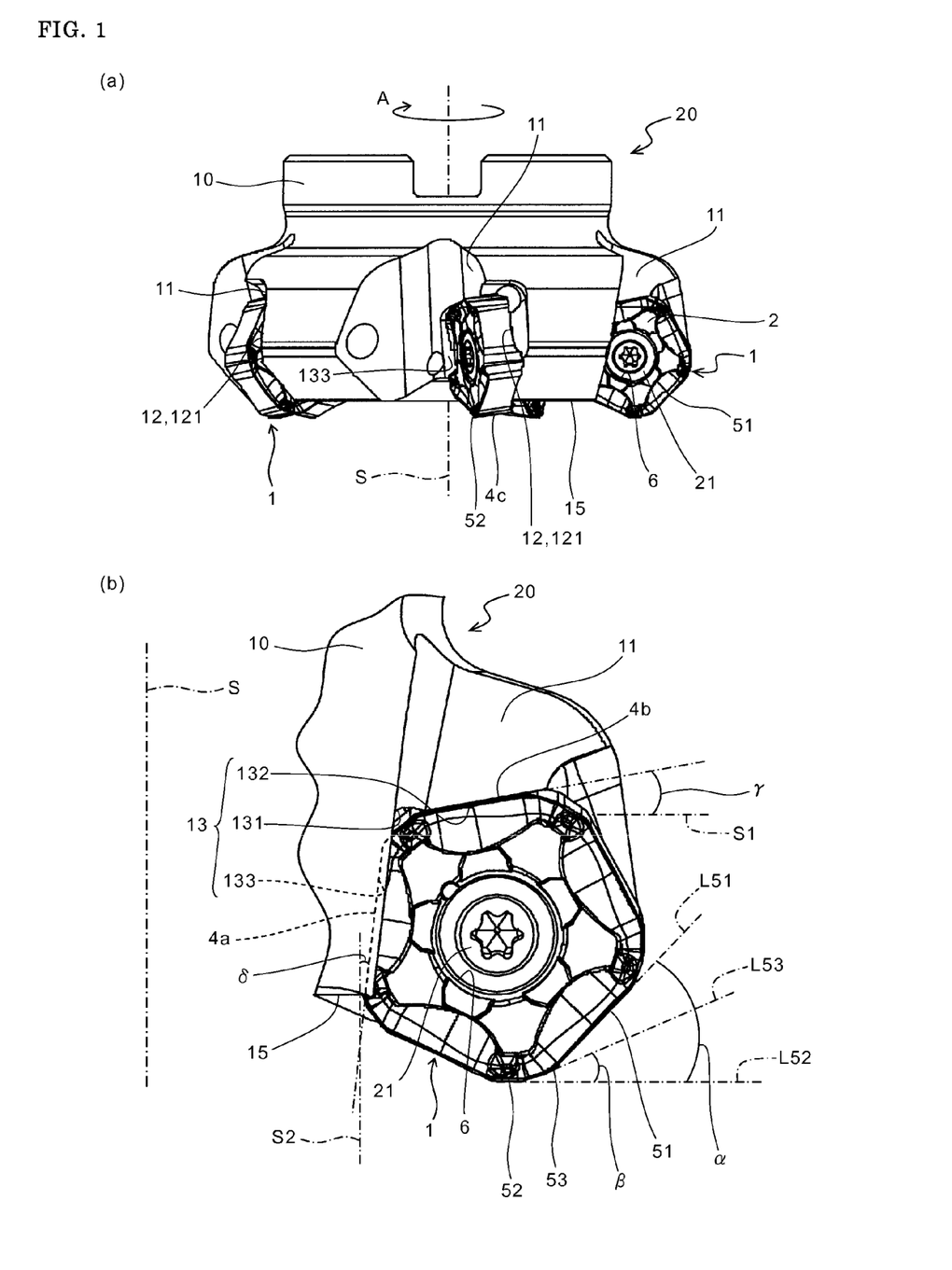

An embodiment of the cutting tool according to the present invention is described in detail below with reference to FIGS. 1 to 5. As shown in FIG. 1, the cutting tool 20 (rotary cutting tool) of the present embodiment includes a cutting insert (hereinafter referred to as "insert" in some cases) 1, and a holder 10 having at a front end part 15 thereof insert pocket 11 for attaching the insert 1 thereto. Firstly, the insert 1 and the holder 10 that are elements constituting the cutting tool 20 are described in detail.

(Cutting Insert)

Figure 2:
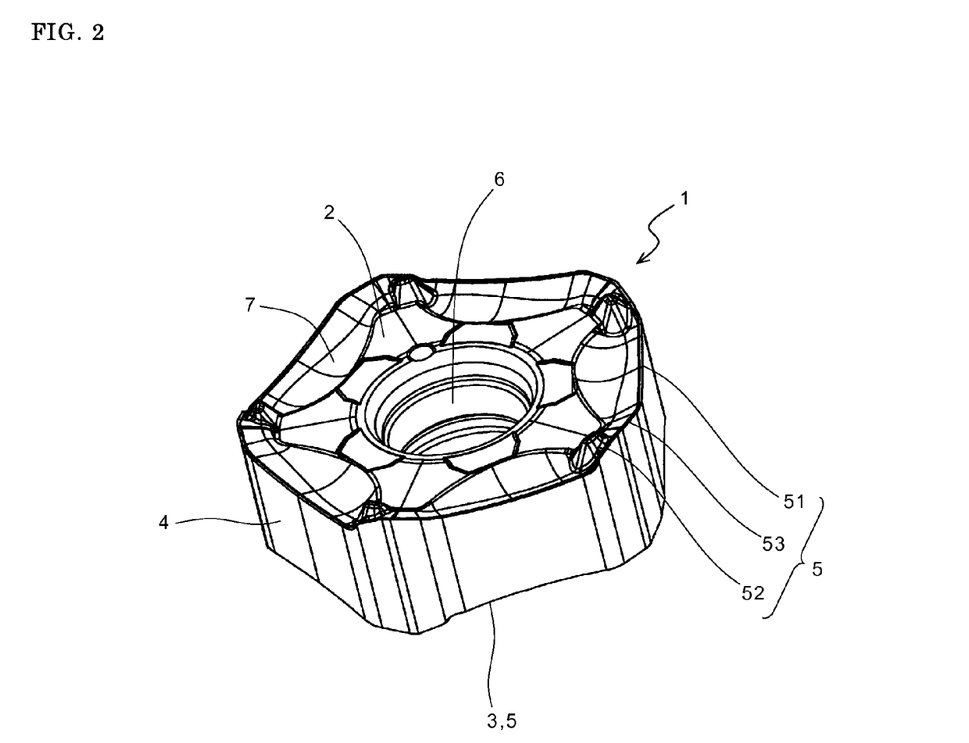
FIG. 2 is a partially enlarged view of a cutting insert in the cutting tool shown in FIG. 1.
Figure 3:
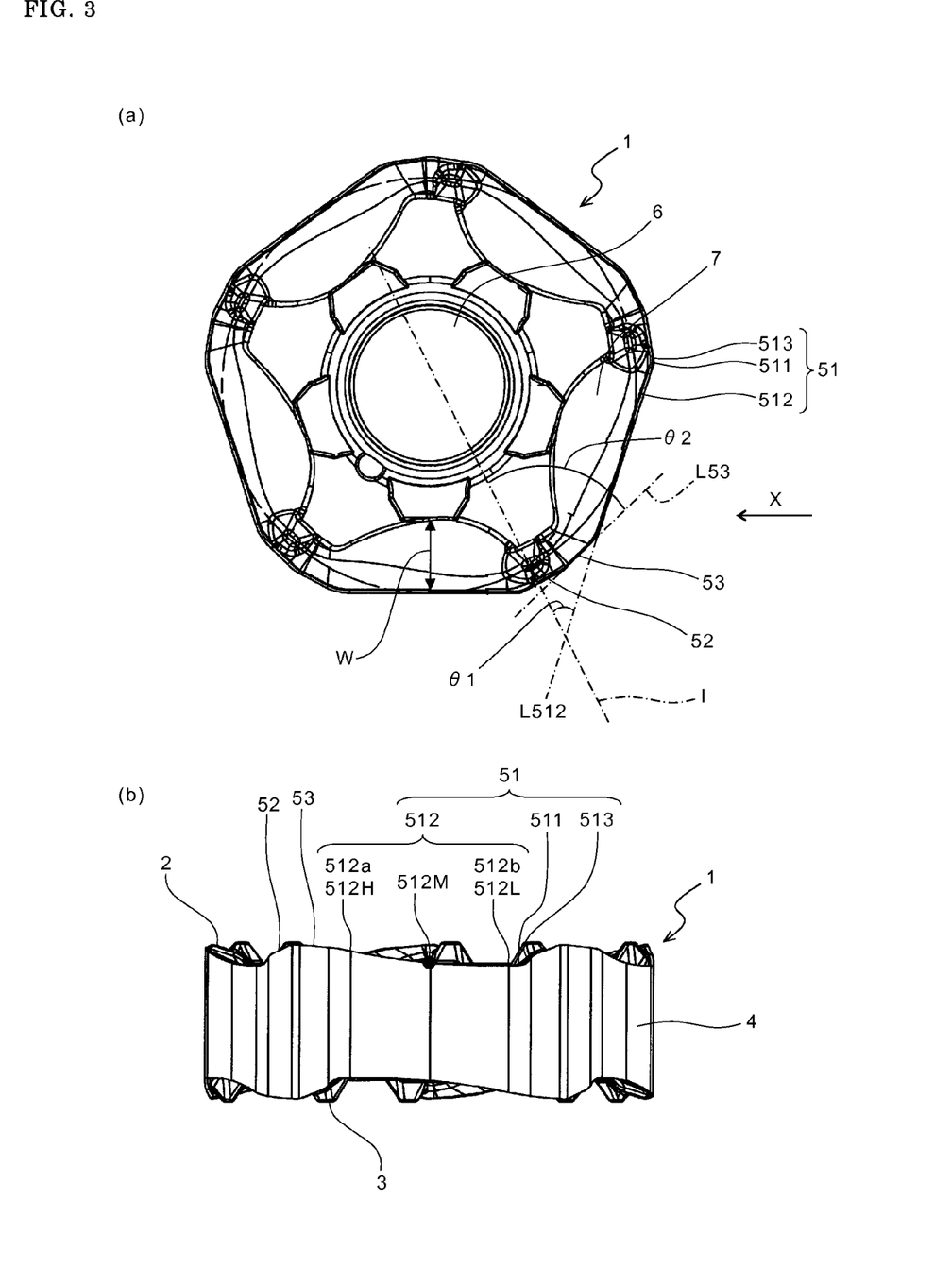

Referring to FIG. 2, each of the insert 1 includes a body part of a substantially polygonal plate shape. No particular limitation is imposed on the shape of the body part. That is, the body part may have a certain shape usually employed by those skilled in the art, such as triangle, quadrangle, pentagon, hexagon, and octagon in a top view. The present embodiment employs a substantially pentagonal shape having five long sides.

The body part is preferably made of a cemented carbide substrate, a cermet substrate, or the like. A PVD film or CVD film formed by PVD method or CVD method, or a composite film of these is preferably formed on the surface of these substrates. In particular, a structure having the PVD film formed on the surface of the cemented carbide substrate is suitable in the machining necessitating chipping resistance, such as when cutting steel, stainless steel, or ductile cast iron. A structure having the CVD film formed on the surface of the cemented carbide substrate is suitable in the machining necessitating wear resistance, such as high-speed cutting of gray cast iron. A structure having the PVD film formed on the surface of the cermet substrate is suitable in finishing.

The body part also includes an upper surface 2, a part of which functions as a rake face; a lower surface 3, a part of which functions as a seating face; a side surface 4 which is continuous with the upper surface 2 and the lower surface 3, and function as a flank face; and a cutting edge 5 located along an intersection of the upper surface 2 and the side surface 4. The rake face denotes the part performing the role in allowing chips to smoothly discharge to the exterior by coming into contact with the chips generated by the cutting edge 5 so as to change a traveling direction of the chips and deform the shapes of chips into a helical shape or the like. The seating face denotes the part to be brought into contact with a seating part 12 of the holder 10 when the insert 1 is attached to the holder 10.

The side surface 4 is perpendicularly connected to the upper surface 2 and the lower surface 3. That is, the insert 1 is a negative type insert allowing both the upper surface 2 and the lower surface 3 to be used as the rake face. Therefore, the insert 1 is the insert whose ten corners are usable. In this case, the cutting edge 5 is also formed along an intersection of the lower surface 3 and the side surface 4. When the cutting edge 5 close to the lower surface 3 is used, the lower surface 3 is used as the rake face, and the upper surface 2 is used as the seating face. Alternatively, the insert of the present invention may be a so-called positive type insert in which a clearance angle is imparted to the side surface 4.

The cutting edge 5 formed along the intersection of the upper surface 2 and the side surface 4 includes a major cutting edge 51 and a flat cutting edge 52. In the present embodiment, a minor cutting edge 53 is disposed between the major cutting edge 51 and the flat cutting edge 52. The cutting edge 5 may have a linear shape or curved shape.

In the present embodiment, the major cutting edge 51 includes a curved part 511 protruding outward, a major cutting edge part 512 connected to one end of both ends of the curved part 511 close to the flat cutting edge 52, and a connection ridge line part 513 connected to the other end of the curved part 511, in the top view as shown in FIG. 3(a).

The curved part 511 connects between the major cutting edge part 512 and the connection ridge line part 513. The curved part 511 reduces the use of the connection ridge line part 513 as the cutting edge, and provides stable chip discharge performance.

The major cutting edge part 512 is the cutting edge performing a major role in the generation of chips during cutting action. The major cutting edge part 512 is configured to be the longest among the cutting edge 5. As shown in FIG. 3(b), the major cutting edge part 512 is inclined toward the lower surface 3 as the major cutting edge part 512 separates from the flat cutting edge 52. That is, the major cutting edge part 512 is inclined downward in the direction away from the flat cutting edge 52 in a side view. In the present specification, the term "downward" denotes the lower surface side with reference to a plane orthogonal to a center axis of the insert.

When the major cutting edge part 512 is inclined as described above, it is easy to attach the major cutting edge 51 of the insert 1 to the holder 10 so as to have a positive axial rake. That is, the present embodiment employs the negative type insert 1. Therefore, the insert 1 is attached to the holder 10 so that the insert 1 itself has a negative axial rake with respect to a rotation axis direction of the holder 10, while avoiding interference between the flank face (side surface 4) of the flat cutting edge 52 and a finished surface of a workpiece at the front end part of the holder. In this case, the major cutting edge 51 also has a negative axial rake, and hence cutting resistance may be increased.

In the present embodiment, the major cutting edge part 512 is inclined as described above. Therefore, even when the insert 1 provided with the negative axial rake is attached to the holder 10, the major cutting edge 51 can have a positive axial rake. When the major cutting edge has a curved shape, a tangent line in a major cutting edge portion practically used is required to have a positive axial rake. In the present embodiment, a straight line connecting both ends of the major cutting edge part 512 is configured to incline with respect to a line L1 orthogonal to the center axis of the insert 1 (refer to FIGS. 4 and 5).

So long as the shape of the major cutting edge part 512 is inclined downward in the direction away from the flat cutting edge 52, no particular limitation is imposed thereon. For example, the major cutting edge part 512 may be provided with a flute part that divides the major cutting edge part 512 from the viewpoint of cutting resistance reduction.

The major cutting edge part 512 may be formed by combining only a plurality of linear portions (hereinafter referred to as "major cutting edge linear portions" in some cases), or may be formed by combining the linear portion and a curved portion (hereinafter referred to as "major cutting edge curved portion" in some cases). The major cutting edge entirely bent into a curved shape is suitable for more stable chip curling. It is particularly preferable that a radius of curvature be increased, namely, a curvature be decreased from one end 512a of the major cutting edge 512 close to the flat cutting edge 52 to the other end 512b. This permits more stable chip curling.

The major cutting edge part 512 preferably includes an arcuate major cutting edge curved portion. In this case, the curvature of the major cutting edge curved portion can be measured by observing the side surface with a CCD camera or image measuring instrument.

When the major cutting edge part 512 includes the major cutting edge curved portion, it is preferred to combine a linear portion together, from the viewpoint of the insert strength. For example, fracture or the like of the cutting edge 5 can be reduced by applying the linear portion to a location initially brought into contact with a workpiece. For example, when the linear portion and the curved portion are formed in the order named from an end portion close to the corresponding minor cutting edge 52, the linear portion length and the curved portion length are preferably in the ratio of approximately 1:9 to 2:8. The linear portion and the curved portion may be parallel to or inclined with respect to the line L1 orthogonal to the center axis of the insert 1 in a side view.

As described above, the major cutting edge part 512 is configured so that the straight line connecting both ends thereof is inclined with respect to the line L1 orthogonal to the center axis of the insert 1. This allows chips to extend helically. An inclination angle of the straight line with respect to the line L1 may be set in consideration of, for example, the inclination of the attached insert pocket 11 of the holder 10, and the strength of the insert 1. For example, a suitable inclination angle is approximately 5-20° with respect to the line L1.

The major cutting edge part 512 further includes a valley portion 512L having a minimum height with respect to the lower surface 3, and a top portion 512H having a maximum height with respect to the lower surface 3. In the present embodiment, the valley portion 512L is located further away from the corresponding flat cutting edge 52 than a middle portion 512M of the major cutting edge part 512. That is, when "a" denotes a distance between the corresponding flat cutting edge 52 and the valley portion 512L, and "b" denotes a distance between the corresponding flat cutting edge 52 and the middle portion 512M, "a" and "b" have a relationship of a>b. Thereby, while a chip is curled and rotated once, the diameter (curl diameter) of its rotating body can be minimized at the end 512a of the major cutting edge part 512 (the end portion close to the corresponding minor cutting edge). Hence, the chip helical body is less susceptible to diameter enlargement, thereby improving chip discharge performance.

The valley portion 512L is the portion where the distance between the lower surface 3 and the major cutting edge part 512 is a minimum in a direction substantially perpendicular to the lower surface 3. On the other hand, the top portion 512H is the portion where the distance between itself and the lower surface 3 is a maximum. Both the valley portion 512L and the top portion 512H may be a point or a linear portion having a certain width. In the present embodiment, the valley portion 512L is located at the same position as the end 512b of the major cutting edge 512, and the top portion 512H is located at the same position as the end 512a of the major cutting edge part 512.

The middle portion 512M of the major cutting edge part 512 denotes a middle point of the distance between the two ends 512a and 512b of the major cutting edge part 512 in a top view. The corresponding flat cutting edge 52 denotes the flat cutting edge contributing to cutting together with the major cutting edge part 512.

On the other hand, the connection ridge line part 513 is formed through the curved part 511 at the end 512b of the major cutting edge part 512. The connection ridge line part 513 is inclined away from the lower surface 3 in the direction away from the flat cutting edge 52 in a side view. That is, the connection ridge line part 513 is inclined upward in the direction away from the flat cutting edge 52 in the side view. In the present specification, the term "upward" denotes the opposite direction to the lower surface with reference to the plane orthogonal to the center axis of the insert. Although the connection ridge line part 513 may have either a linear shape or a curved shape, the linear shape is preferred from the viewpoint of the foregoing purpose. Alternatively, the connection ridge line part 513 may be made up of two liner portions.

When the connection ridge line part 513 is made up of the two linear portions, namely, when the connection ridge line part 513 is made up of a first connection ridge line portion 513a connected through the curved part 511 to the end 512b of the major cutting edge part 512, and a second connection ridge line portion 513b connected to the first connection ridge line portion 513a, a rising angle θ513a of the first connection ridge line portion 513a is preferably smaller than a rising angle θ513b of the second connection ridge line portion 513b. Thereby, when the chips generated by the major cutting edge part 512 are curled helically, the interference between the flat cutting edge 52 and the chips can be reduced effectively, thereby obtaining the effect of eliminating any obstruction to chip discharge.

The rising angle θ513a of the first connection ridge line portion 513a denotes an angle formed by the first connection ridge line portion 513a and the line L1 orthogonal to the center axis of the insert 1. The rising angle θ513b of the second connection ridge line portion 513b is prescribed similarly to the rising angle θ513a.

In the major cutting edge part 512 and the connection ridge line part 513, an angle formed by a virtual extension line of the major cutting edge part 512 and a virtual extension line of the connection ridge line part 513 is preferably 165° or less, more preferably 90-165°. This reduces the use of the connection ridge line part 513 as the cutting edge, thereby decreasing fractures of the insert 1.

In the present embodiment, an angle θ512 formed by the major cutting edge. part 512 and the line L1 orthogonal to the center axis of the insert 1 is configured to be smaller than an angle (the rising angle θ513b) formed by the connection ridge line part 513 and the line L1.

When the major cutting edge part 512 has, for example, the curved part, the angle θ512 formed by the major cutting edge part 512 and the line L1 is not a constant angle. In this case, a maximum angle among those formed by the major cutting edge part 512 and the line L1 may be evaluated. The angle formed by the connection ridge line part 513 and the line L1 is also evaluated similarly.

The flat cutting edge 52 is formed for improving the surface finish roughness of a workpiece. The flat cutting edge 52 has a linear shape in the top view as shown in FIG. 3(a), and is upwardly inclined toward the minor cutting edge 53 in the side view as shown in FIG. 3(b). Similarly to the major cutting edge 51, no particular limitation is imposed on the shape of the flat cutting edge 52.

Figure 5:
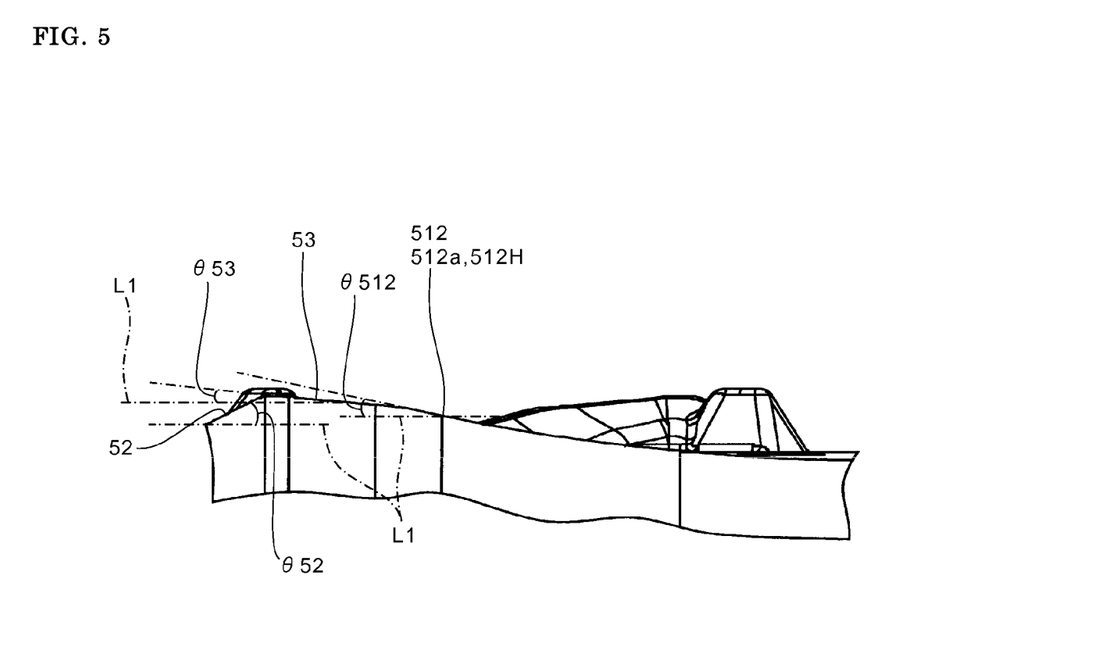
FIG. 5 is a partially enlarged view of the cutting insert shown in FIG. 3(*b*)

In major cutting edge part 512 and the flat cutting edge 52 of the present embodiment, as shown in FIG. 5, the angle θ512 formed by the major cutting edge part 512 and the line L1 orthogonal to the center axis of the insert 1 is configured to be smaller than an angle θ52 formed by the flat cutting edge 52 and the line L1. This permits attachment to the holder so as to have a positive axial rake in, for example, a large region of more than a half of a maximum amount of depth of cut of the major cutting edge part 512.

Referring to FIG. 1(b), an angle a formed by a virtual extension line L51 of the major cutting edge 51 and a virtual extension line L52 of the flat cutting edge 52 preferably is more than 45° but 50° or less in a top view. In the major cutting edge 51 having such an inclination angle, the chips generated from the major cutting edge 51 during cutting have a relatively small thickness, thus reducing cutting resistance. In the present embodiment, the virtual extension line L51 of the major cutting edge 51 denotes a virtual straight line extended from the major cutting edge part 512.

The minor cutting edge 53 has a larger peripheral cutting edge angle than the major cutting edge part 512, and is disposed in order to support the cutting by the major cutting edge part 512, for example, for the purpose of decreasing the cutting resistance of the major cutting edge part 512, or reducing damage to the major cutting edge part 512. The minor cutting edge 53 may have a linear shape or curved shape. In the present embodiment, the minor cutting edge 53 is connected to the major cutting edge part 512.

In the present specification, the term "peripheral cutting edge angle" denotes an inclination angle of the cutting edge with respect to the rotation axis of the holder when the insert is attached to the holder. For example, as shown in FIG. 3(a), the peripheral cutting edge angle of the major cutting edge part 512 can be expressed by an angle θ1 formed by a line 1 parallel to the rotation axis S of the holder 10, and a virtual extension line L512 of the major cutting edge part 512 in a top view. The peripheral cutting edge angle of the minor cutting edge 53 can be expressed by an angle θ2 formed by the line 1 and a virtual extension line L53 of the minor cutting edge 53.

For example, the peripheral cutting edge angle θ1 of the major cutting edge part 512 is set to approximately 0-60°, and the peripheral cutting edge angle θ2 of the minor cutting edge 53 is set to approximately 60-80°. In order to reduce or decrease damage and defect in the cutting edges 5, the peripheral cutting edge angle θ2 of the minor cutting edge 53 is preferably set to more than 1.2 times, preferably more than 1.5 times the peripheral cutting edge angle θ1 of the major cutting edge part 512.

Referring to FIG. 1(b), an angle β formed by the virtual extension line L53 of the minor cutting edge 53 and the virtual extension line L52 of the flat cutting edge 52 is preferably 20° or less. The reasons for this are as follows.

For example, if the substantially pentagonal plate shaped insert 1 of the present embodiment is used under cutting conditions that the amount of depth of cut is small and the feed rate is large, the insert 1 might rotate around an attachment screw 21. However, when the minor cutting edge 53 is formed to have the angle β in the above-mentioned numerical range, the cutting resistance during high feed can be decreased, and the rotation of the insert 1 can be reduced.

Further, as shown in FIG. 5, the angle θ53 formed by the minor cutting edge 53 and the center axis of the insert 1 is preferably smaller than the angle θ512 formed by the major cutting edge part 512 and the line L1 in a side view. This improves fracture resistance of a part of the minor cutting edge 53 which is initially brought into contact with a workpiece during cutting process. At the same time, the cutting resistance can be decreased by a high-rake portion of the major cutting edge part 512 after the cutting edge 5 engages the workpiece, namely, in a continuous cutting state.

On the other hand, a screw hole 6 extending through the body part from the upper surface 2 to the lower surface 3 is formed on the upper surface 2 corresponding to the rake face. The screw hole 6 is formed at a middle part of the upper surface 2. The screw hole 6 is specifically a holder attachment hole and is formed into a substantially cylindrical shape so as to extend through the body part.

The screw hole 6 is formed for fixing the insert 1 to the holder 10. That is, the insert 1 is fixed to the holder 10 by inserting the attachment screw 21 into the screw hole 6 and then screwing it into the holder 10.

Further, a breaker groove 7 located correspondingly to the major cutting edge part 512 is formed on the upper surface 2. Specifically, the breaker groove 7 is formed on the upper surface 2 along the major cutting edge part 512. The breaker groove 7 is formed for further facilitating curling of the chips generated from the major cutting edge part 512.

A width W of the breaker groove 7 is the largest at a position corresponding to the middle portion 512M of the major cutting edge part 512, as shown in FIG. 3(a). The width W of the breaker groove 7 denotes a width of a portion contributing to chip curling action. A depth D (not shown) of the breaker groove 7 is also the largest at the position corresponding to the middle portion 512M of the major cutting edge part 512. The portion where the width W is the largest, and the portion where the depth D is the largest may correspond to a region between the middle portion 512M and the valley portion 512L.

Figure 4:
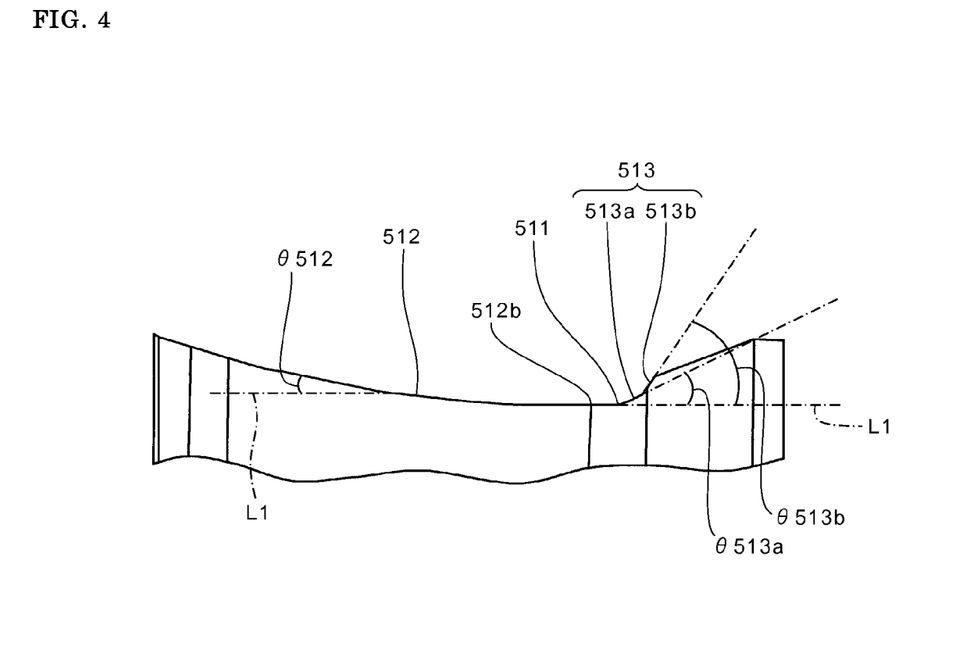
FIG. 4 is a partially enlarged view when the cutting insert shown in FIG. 3(*a*) is viewed from the direction of arrow X.

In the present embodiment, the foregoing major cutting edge part 512 has a concave shape toward the lower surface 3 in a side view, as shown in FIGS. 3(b) and 4. Therefore, the cross-sectional shape of the chip generated therefrom also has the concave shape. A rising face of the breaker groove 7 which is formed along the major cutting edge part 512 has a concave shape in a sectional view parallel to the major cutting edge part 512. Hence compared to a flat rising face, the generated concave-shaped chips are less susceptible to lateral swaying with respect to a discharge direction, and are stably discharged.

(Holder)

Referring to FIG. 1, the holder 10 has a substantially disk shape, and has the plurality of insert pockets 11 for attaching the insert 1 along an outer peripheral portion of the front end part 15. Each of the insert pockets 11 includes a seating part 12 configured to be brought into contact with the lower surface 3 of the insert 1, and a constraining part 13 configured to be brought into contact with a first side surface 4a and a second side surface 4b adjacent to each other among the side surface 4 of the insert 1. The body part of the insert 1 has the substantially pentagonal shape having the five long sides as described above. Therefore, the body part of the insert 1 has the five side surfaces 4 located correspondingly to their respective sides. The first side surface 4a and the second side surface 4b denote the two side surfaces 4 adjacent to each other among these five side surfaces 4.

The seating part 12 is formed for seating the upper surface 2 or the lower surface 3 of the insert 1. The seating part 12 includes a seating face 121 inclined forward in the rotation direction of the holder 10 as indicated by arrow A, in the direction away from the front end part 15 of the holder 10, in order to impart a clearance angle to the rear of the flat cutting edge 52 when attaching the negative type insert 1. Here at, the rear of the flat cutting edge 52 corresponds to the side surface 4c located correspondingly to the flat cutting edge 52 (refer to FIG. 1(a)).

The constraining part 13 is disposed vertically from the seating part 12 in order to constrain the side surface 4 of the insert 1. The constraining part 13 includes a curved portion 131, a first constraining face 132 connected to one end of the curved portion 131, and a second constraining face 133 connected to the other end of the curved portion 131.

The first constraining face 132 extends perpendicularly with respect to the rotation axis S of the holder 10 in the direction away from the curved portion 131, or extends away from the front end part 15 of the holder 10. The second constraining face 133 extends toward the front end part 15 of the holder 10 in the direction away from the curved portion 131. Owing to the constraining part 13 thus configured, the region between the first constraining face 132 and the second constraining face 133, namely the vicinity of the curved portion 131 is less susceptible to expansion against the thrust force of cutting force. Hence, the first constraining face 132 and the second constraining face 133 are less susceptible to plastic deformation, thus having excellent durability.

When the first constraining face 132 extends away from the front end part 15 of the holder 10 in the direction away from the curved portion 131, an angle formed by itself and a plane perpendicular to the rotation axis S is preferably 15° or less. In the present embodiment, as shown in FIG. 1(b), an angle γ formed by the first constraining face 132 and the plane S perpendicular to the rotation axis S is 10-13°.

The second constraining face 133 preferably extends parallel to the rotation axis S, or extends toward the rotation axis S from an end portion close to the curved portion 131. When the second constraining face 133 extends toward the rotation axis S, an angle formed by itself and the plane perpendicular to the rotation axis S is preferably 15° or less. In the present embodiment, an angle δ formed by the second constraining face 133 and the plane S2 perpendicular to the rotation axis S is 4-8°.

An angle (not shown) formed by a virtual extension line of the first constraining face 132 and a virtual extension line of the second constraining face 133 is preferably 90-120°. This improves constraining stability of the inserts.

Preferably, both the first constraining face 132 and the second constraining face 133 perpendicularly intersect the seating face 121. This ensures that the first constraining face 132 and the Second constraining face 133 contact the first side surface 4a and the second side surface 4b adjacent to each other in the insert 1.

An intersection of the seating part 12 and the constraining part 13 may include a curved surface shaped concave flute. That is, the intersection of the first constraining face 132 and the seating face 121, and the intersection of the second constraining face 133 and the seating face 121 may include the curved surface shaped concave flute.

In the cutting tool 20 of the present embodiment including the inserts 1 and the holder 10 as described above, the inserts 1 are respectively attached to outer peripheral positions, in the insert pockets 11 of the holder 10, as shown in FIG. 1.

To be specific, each of the inserts 1 is attached so that the upper surface (rake face) 2 is oriented in the rotation direction, and the major cutting edge 51 is located at the outermost periphery. The insert 1 is also attached to the holder 10 so that the flat cutting edge 52 is perpendicular to the rotation axis S. As described above, the attachment is carried out by inserting the attachment screw 21 into the screw hole 6 of the insert 1 and then screwing it into the holder 10.

The insert 1 that is the negative type insert is attached to the holder 10 with a negative axial rake of approximately 6° in a side view. In the present embodiment, as described above, the major cutting edge part 512 is inclined downward in the direction away from the flat cutting edge 52 (refer to FIG. 3(b)). Hence, the major cutting edge part 512 has a positive axial rake with respect to the rotation axis S of the holder 10.

Alternatively, the major cutting edge part 512 may have a negative axial rake with respect to the rotation axis S of the holder 10. In the cutting tool 20, cutting is carried out with the major cutting edge 51 by rotating the holder 10.

<Method of Manufacturing Machined Product>

Figure 6:
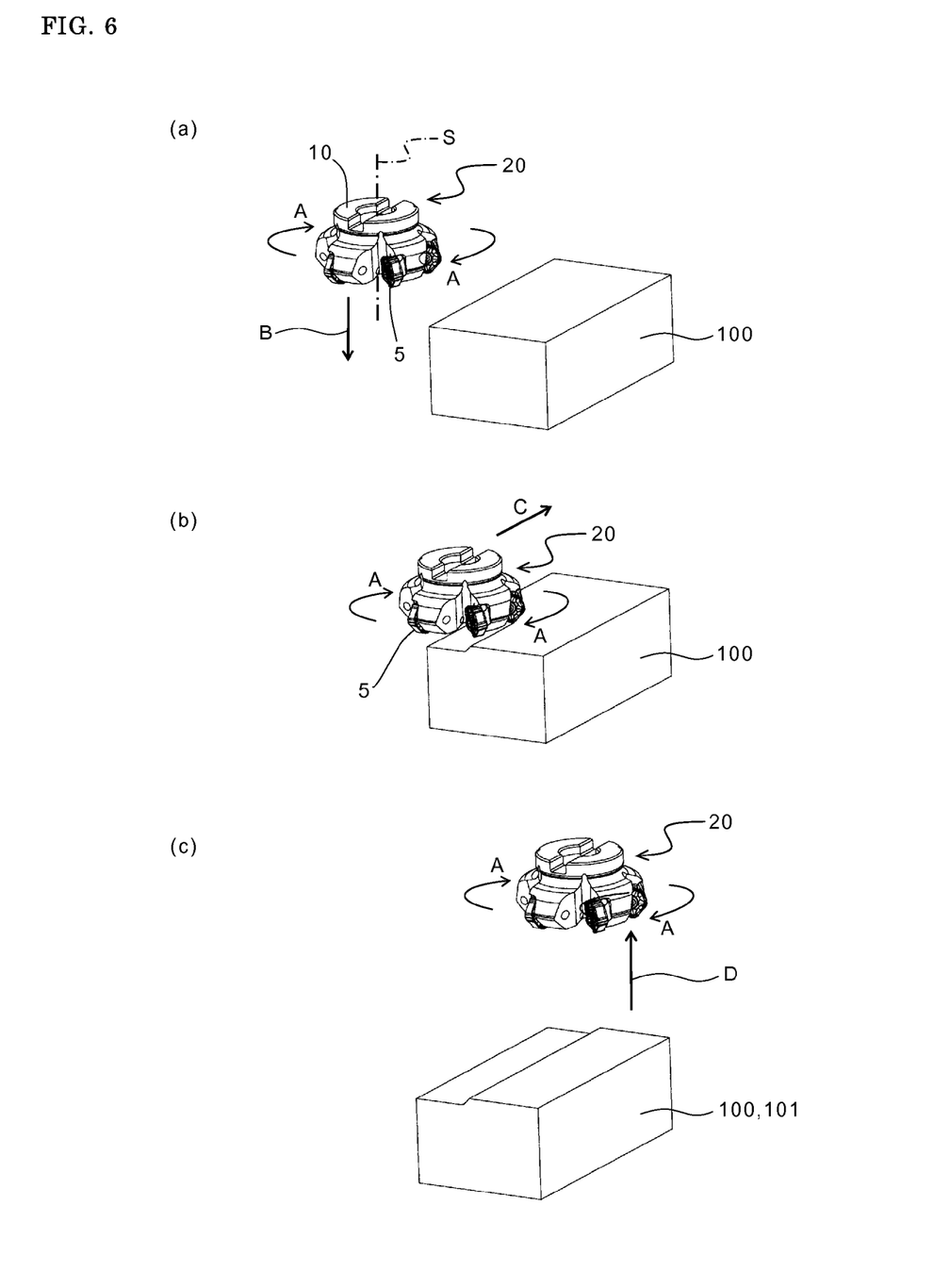

An embodiment of the method of manufacturing a machined product according to the present invention is described in detail below with reference to FIG. 6, by taking the case of using the cutting tool 20 as example. As shown in FIG. 6, the method of manufacturing the machined product according to the present embodiment includes the step of rotating the cutting tool 20; the step of bringing the cutting edge 5 of the rotating cutting tool 20 into contact with a workpiece 100; and the step of separating the cutting tool 20 from the workpiece 100.

To be specific, firstly, the inserts 1 are attached to the holder 10. At this time, the inserts 1 are attached to the insert pockets 11 of the holder 10 along the same circumference of the holder 10.

Subsequently, as shown in FIG. 6(a), the cutting tool 20 is rotated in the direction of arrow A around the rotation axis S of the holder 10. Then, the cutting edges 5 are brought near the workpiece 100 by moving the cutting tool 20 in the direction of arrow B.

Subsequently, as shown in FIG. 6(b), a surface of the workpiece 100 is cut by bringing the cutting edges 5 of the rotating cutting tool 90 into contact with the surface of the workpiece 100, and by moving the cutting tool 20 in the direction of arrow C. For example, the cutting tool 20 is capable of cutting the surface of the workpiece 100 in substantially parallel.

Thereafter, as shown in FIG. 6(c), the cutting tool 20 is separated from the workpiece 100 by moving the cutting tool 20 in the direction of arrow D. When the cutting is continued, the step of bringing the cutting edge 5 of the cutting tool 20 into contact with different portions of the workpiece 100 may be repeated while retaining the rotation of the cutting tool 20. As a result, the machined product 101 is obtained.

When the cutting edge 5 in use is worn, an unused cutting edge 5 may be used by rotating the insert 1 around the center axis of the insert 1.

While the several preferred embodiments according to the present invention have been described and illustrated above, it is to be understood that the present invention is not limited to the foregoing embodiments and is applicable to any optional embodiments without departing from the gist of the present invention.

For example, in the insert according to the foregoing embodiment, the description has been made by taking, for example, the case where the major cutting edge includes the curved part, the major cutting edge part, and the connection ridge line part. Alternatively, the major cutting edge according to the present invention may be constituted only by a straight linear or curvilinear cutting edge. The major cutting edge according to this embodiment is preferably inclined toward the lower surface in the direction away from the flat cutting edge. This major cutting edge preferably has a concave shape in a side view. The insert including this major cutting edge is preferably attached to the holder so that the major cutting edge has a positive axial rake with respect to the rotation axis of the holder. Other configurations are identical to those of the inserts 1 according to the foregoing embodiment, and therefore the description thereof is omitted.

The invention claimed is:

1. A cutting tool, comprising:
 a cutting insert comprising a body part in a polygonal plate shape, a cutting edge located along an intersection of an upper surface and a side surface of the body part; and
 a holder comprising an insert pocket for attaching the cutting insert at a front end part of the holder, wherein the insert pocket comprises
   a seating part comprising a seating face which is brought into contact with a lower surface of the cutting insert, and is inclined forward in a rotation direction of the holder as the seating face extends away from the front end part of the holder, and
   a constraining part configured to be brought into contact with a first side surface and a second side surface adjacent to each other along the side surface of the body part, the constraining part comprises
     a curved portion,
     a first constraining face which is connected to one end of the curved portion, and extends perpendicularly with respect to the rotation axis of the holder or extends away from the front end part of the holder as the first constraining face extends away from the curved portion, and
     a second constraining face which is connected to the other end of the curved portion, extends toward the front end part of the holder as the second constraining face extends away from the curved portion and extends toward the rotation axis from an end portion close to the curved portion.

2. The cutting tool according to claim 1, wherein the upper surface and the side surface are perpendicularly connected to each other.

3. The cutting tool according to claim 1 or 2, wherein the cutting edge comprises a major cutting edge and a flat cutting edge, and when the cutting insert is viewed from above, an angle formed by a virtual extension line of the major cutting edge and a virtual extension line of the flat cutting edge is more than 45° but 50° or less.

4. The cutting tool according to claim 3, wherein the cutting edge further comprises a minor cutting edge located between the major cutting edge and the flat cutting edge.

5. The cutting tool according to claim 4, wherein, when the cutting insert is viewed from above, an angle formed by a virtual extension line of the minor cutting edge and a virtual extension line of the flat cutting edge is 20° or less.

6. The cutting tool according to claim 3, wherein the major cutting edge is inclined toward the lower surface as the major cutting edge separates from the flat cutting edge in a side view of the cutting insert.

7. The cutting tool according to claim 3, wherein the major cutting edge has a concave shape in the side view of the cutting insert.

8. The cutting tool according to claim 1, wherein the first constraining face has an angle of 15° or less with respect to a plane perpendicular to the rotation axis of the holder.

9. The cutting tool according to 1, wherein the second constraining face has an angle of 15° or less with respect with a plane parallel to the rotation axis of the holder.

10. The cutting tool according to claim 1, wherein an angle formed by a virtual extension line of the first constraining face and a virtual extension line of the second constraining face is 90-120°.

11. The cutting tool according to claim 1, wherein both the first constraining face and the second constraining face perpendicularly intersect the seating face.

12. The cutting tool according to claim 3, wherein the cutting insert is attached to the holder, and the major cutting edge has a positive axial rake with respect to the rotation axis of the holder.

13. The cutting tool according to claim 3, wherein the cutting insert is attached to the holder and the flat cutting edge is perpendicular to the rotation axis of the holder.

14. A method of manufacturing a machined product, comprising: rotating a cutting tool according to claim 1; bringing the cutting edge of the rotating cutting tool into contact with a workpiece; and separating the cutting tool from the workpiece.

* * * * *